(12) United States Patent
Hatano et al.

(10) Patent No.: US 8,525,458 B2
(45) Date of Patent: Sep. 3, 2013

(54) BRUSHLESS MOTOR POSITION DETECTION DEVICE

(75) Inventors: Kenta Hatano, Tokyo (JP); Toshiyuki Umemoto, Tokyo (JP); Naoki Miyamoto, Tokyo (JP); Satoshi Fujimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 546 days.

(21) Appl. No.: 12/812,248

(22) PCT Filed: Jan. 16, 2009

(86) PCT No.: PCT/JP2009/000151
§ 371 (c)(1),
(2), (4) Date: Jul. 9, 2010

(87) PCT Pub. No.: WO2009/125527
PCT Pub. Date: Oct. 15, 2009

(65) Prior Publication Data
US 2010/0289442 A1 Nov. 18, 2010

(30) Foreign Application Priority Data
Apr. 7, 2008 (JP) .................................. 2008-099289

(51) Int. Cl.
*H02K 29/08* (2006.01)
(52) U.S. Cl.
USPC ...................... 318/400.38; 318/721; 318/722
(58) Field of Classification Search
USPC ............... 318/400.38, 722, 721, 400.11, 700, 318/400.41, 400.04, 400.14; 310/71
See application file for complete search history.

(56) References Cited

U.S. PATENT DOCUMENTS

| | | |
|---|---|---|
| 2002/0117914 A1 | 8/2002 | Doi et al. |
| 2008/0238412 A1 | 10/2008 | Jaervelaeinen et al. |
| 2009/0302793 A1* | 12/2009 | Kawamura et al. ...... 318/400.38 |

FOREIGN PATENT DOCUMENTS

| | | |
|---|---|---|
| DE | 102004014986 A1 | 11/2005 |
| EP | 1271752 A1 | 1/2003 |
| JP | 6-303752 A | 10/1994 |
| JP | 2002-252958 A | 9/2002 |
| JP | 2003-4486 A | 1/2003 |
| JP | 2006-109553 A | 4/2006 |
| JP | 2006-314165 A | 11/2006 |
| WO | 2006/051590 A1 | 5/2006 |
| WO | 2006/103132 A1 | 10/2006 |
| WO | 2008/114473 A1 | 9/2008 |

* cited by examiner

*Primary Examiner* — Karen Masih
(74) *Attorney, Agent, or Firm* — Birch, Stewart, Kolasch & Birch, LLP

(57) ABSTRACT

A brushless motor position detection device has a set of first Hall elements (main Hall ICs 18 for detecting magnetic pole positions) and a set of second Hall elements (sub-Hall ICs 19 for detecting magnetic pole positions) mounted on a plane facing a magnetic pole position detecting magnet 16 for detecting the position of a rotor 12. They are subjected to offset adjustment and are mounted in such a manner that the difference between the maximum value of the magnetic flux density at the mounting positions of the first Hall elements and the maximum value of the magnetic flux density at the mounting positions of the second Hall elements is held within a prescribed limit (mounted in such a manner as to have the offset of a prescribed machine angle in the circumferential direction) to bring the detection accuracy of the plurality of sets of the Hall elements into agreement.

6 Claims, 3 Drawing Sheets

(a)   (b)

BRUSHLESS MOTOR POSITION DETECTION DEVICE

TECHNICAL FIELD

The present invention relates to a brushless motor position detection device driven by a direct current, which is preferably used as a driving source of a throttle valve or EGR (exhaust gas recirculation system) valve used for an onboard device, or as a driving source of a movable vane of a VG (Variable Geometry) turbo system.

BACKGROUND ART

A brushless motor has, for example, a stator with nine slots, a rotor with eight poles, a magnetic pole position detecting magnet with eight poles equal to those of the rotor, and three Hall ICs for detecting the rotation position of the rotor by detecting the magnetism of the magnetic pole position detecting magnet. Such a brushless motor having the rotor and the magnetic pole position detecting magnet with the same number of poles, and the three Hall ICs is referred to as a single precision brushless motor.

In comparison with the single precision brushless motor, to improve the resolution of the rotation position detection of the rotor, a brushless motor has been developed which doubles the number of poles of the magnetic pole position detecting magnet, that is, which provides the magnetic pole position detecting magnet with 2n poles for the rotor with n poles (see Patent Document 1, for example).

Such a brushless motor having the magnetic pole position detecting magnet with the number of poles double that of the rotor, and the three Hall ICs is referred to as a double precision brushless motor. According to the double precision brushless motor, it can make the resolution of the rotation position detection of the rotor twice that of the single precision brushless motor.

Patent Document 1: Japanese Patent Laid-Open No. 2002-252958.

DISCLOSURE OF THE INVENTION

On the other hand, in comparison with the double precision brushless motor described above, a quadruple precision brushless motor that further improves the resolution of the rotation position detection is desired.

The quadruple precision brushless motor having double the rotation position detection resolution of the double precision brushless motor further has three Hall ICs for position detection in addition to the three Hall ICs the double precision brushless motor has. Here, the three Hall ICs the double precision brushless motor has are referred to as main Hall ICs for detecting magnetic pole positions, and the three Hall ICs added for the quadruple precision are referred to as sub-Hall ICs for detecting magnetic pole positions.

Although the main Hall ICs for detecting magnetic pole positions and the sub-Hall ICs for detecting magnetic pole positions are mounted with an offset with a prescribed machine angle, high mounting position accuracy between the main Hall ICs for detecting magnetic pole positions and the sub-Hall ICs for detecting magnetic pole positions is required to achieve the high resolution of the quadruple precision. Accordingly, it is necessary to hold the detection angle error to a minimum.

The present invention is implemented to solve the foregoing problem. Therefore it is an object of the present invention to provide a brushless motor position detection device capable of improving the reliability by holding the detection angle error between the main Hall ICs for detecting magnetic pole positions and the sub-Hall ICs for detecting magnetic pole positions to a minimum.

To solve the foregoing problem, the brushless motor position detection device in accordance with the present invention includes: a stator having a plurality of coils mounted; a rotor that has a prescribed number of poles and rotates when the stator is successively excited by a plurality of exciting patterns; a magnetic pole position detecting magnet mounted on a plane perpendicular to a rotation axis of the rotor; a set of first Hall elements mounted on a plane facing the magnetic pole position detecting magnet for detecting the position of the rotor; and a set of second Hall elements whose offset is adjusted in a manner as to keep difference between a maximum value of magnetic flux density at mounting positions of the first Hall elements and a maximum value of magnetic flux density at mounting positions of the second Hall elements within a prescribed limit.

According to the brushless motor position detection device in accordance with the present invention, it can improve the reliability by holding the detection angle error between the main Hall ICs for detecting magnetic pole positions (first Hall elements) and the sub-Hall ICs for detecting magnetic pole positions (second Hall elements) to a minimum.

BEST MODE FOR CARRYING OUT THE INVENTION

The best mode for carrying out the invention will now be described with reference to the accompanying drawings to explain the present invention in more detail.

Embodiment 1

Figure 1:
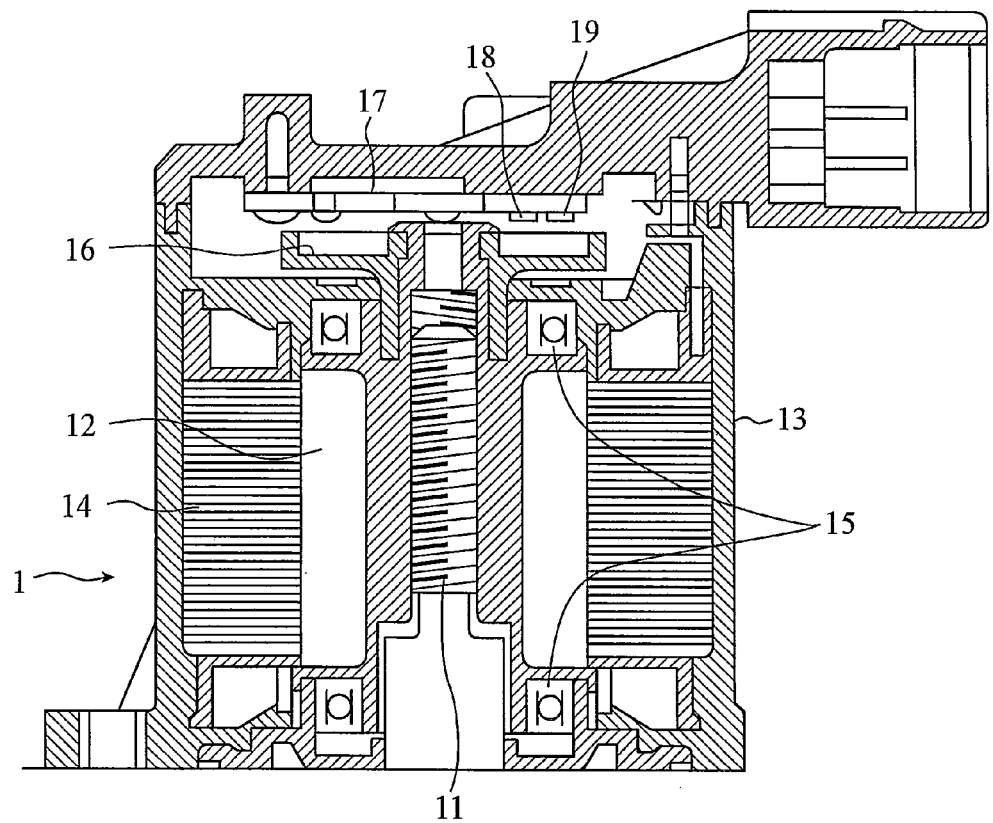
FIG. 1 is a cross-sectional view cut along the axial direction, which shows an actuator incorporating a brushless motor position detection device of an embodiment 1 in accordance with the present invention.

FIG. 1 is a cross-sectional view cut along the axial direction, which shows an actuator incorporating a brushless motor position detection device of an embodiment 1 in accordance with the present invention.

As shown in FIG. 1, an actuator unit 1 has a structure in which a cylindrical rotor 12, into which the motor shaft 11 is fitted, is inserted into a hole of a stator 14 fixed to a casing 13, and is supported by bearings 15 in a freely rotatable manner. In addition, to the rotor 12, a magnetic pole position detecting magnet 16 is fixed perpendicularly to its shaft. Incidentally, the magnetized direction of the magnetic pole position detecting magnet 16 is an axial direction.

In addition, on a printed-circuit board 17, a set of main Hall ICs 18 for detecting magnetic pole positions for three-phase drive and a set of sub-Hall ICs 19 for detecting magnetic pole positions are mounted. The printed-circuit board 17 is fixed to the casing 13 in such a manner that the main Hall ICs 18 for detecting magnetic pole positions and the sub-Hall ICs 19 for detecting magnetic pole positions face to the magnetic pole position detecting magnet 16.

Figure 2:
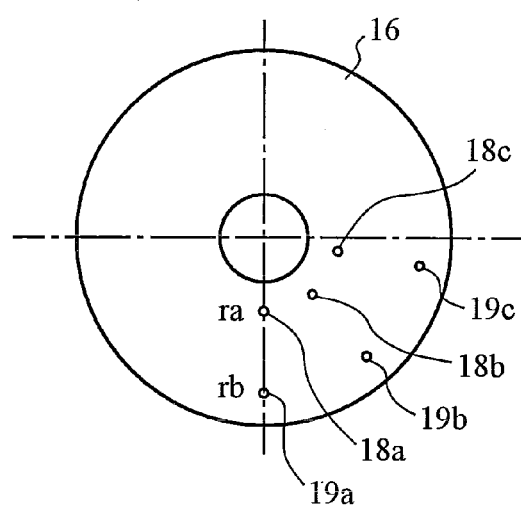
FIGS. 2(*a*) and 2(*b*) are plan views each showing an example of the arrangement of components in the brushless motor position detection device of the embodiment 1 in accordance with the present invention.
Figure 2:
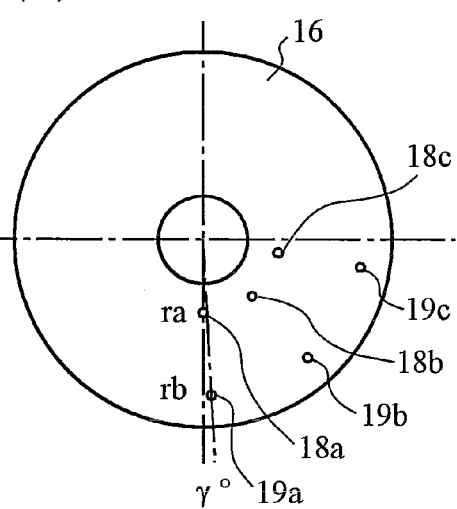

FIGS. 2(a) and 2(b) are plan views each showing the magnetic pole position detecting magnet 16, the main Hall ICs 18 for detecting magnetic pole positions, and the sub-Hall ICs 19 for detecting magnetic pole positions when seen from the Hall IC side: FIG. 2(a) shows an example without an offset angle; and FIG. 2(b) shows an example with an offset angle ($\gamma$).

As shown in FIGS. 2(a) and 2(b), the magnetic pole position detecting magnet 16 is magnetized in the number of poles twice the number of poles of the rotor 12. For example, when the rotor 12 has 12 poles, the magnetic pole position detecting magnet 16 is magnetized in twice the number of poles, that is, 24 poles in a circumferential direction. In addition, the magnetic pole position detecting magnet 16 is composed of a ring magnet having at its center a hole made in a concentric manner as its outer circumference.

The main Hall ICs 18 for detecting magnetic pole positions and the sub-Hall ICs 19 for detecting magnetic pole positions are composed of three Hall ICs (18a, 18b, 18c) and (19a, 19b, 19c) for three-phase drive, respectively. In this case, the main Hall IC 18a for detecting magnetic pole position and the sub-Hall IC 19a for detecting magnetic pole position, the main Hall IC 18b for detecting magnetic pole position and the sub-Hall IC 19b for detecting magnetic pole position, and the main Hall IC 18c for detecting magnetic pole position and the sub-Hall IC 19c for detecting magnetic pole position correspond to each other. Thus, as shown in FIG. 2(a), the main Hall IC 18a for detecting magnetic pole position and the sub-Hall IC 19a for detecting magnetic pole position are placed on a radial line. As for the main Hall IC 18b for detecting magnetic pole position and the sub-Hall IC 19b for detecting magnetic pole position, and the main Hall IC 18c for detecting magnetic pole position and the sub-Hall IC 19c for detecting magnetic pole position, they are placed in the same manner.

For this reason, even if any of the main Hall ICs 18 for detecting magnetic pole positions are damaged, because of the sub-Hall ICs 19 for detecting magnetic pole positions, it becomes possible to drive and control the brushless motor without any adverse effect on its performance, thereby being able to improve the reliability.

In addition, as shown in FIG. 2(b), the sub-Hall ICs 19 (19a, 19b, 19c) for detecting magnetic pole positions are mounted in the radial direction with respect to the main Hall ICs 18 (18a, 18b, 18c) for detecting magnetic pole positions with a machine offset angle ($\gamma$) calculated. The offset angle ($\gamma$) is calculated considering the number of poles of the magnetic pole position detecting magnet 16 and the position detection accuracy of the rotor 12 (double precision or quadruple precision).

Here, the radius of the main Hall ICs 18 for detecting magnetic pole positions, and that of the sub-Hall ICs 19 for detecting magnetic pole positions are ra and rb, respectively. According to this structure, since the variations in the magnetic flux density of the magnetic pole position detecting magnet 16 are detected with both the main Hall ICs 18 for detecting magnetic pole positions and the sub-Hall ICs 19 for detecting magnetic pole positions, the quadruple precision position detection of the number of poles of the rotor 12 becomes logically possible.

In this case, to actually enable the quadruple precision position detection, it is important that the error of the offset angle between the main Hall ICs 18 for detecting magnetic pole positions and the sub-Hall ICs 19 for detecting magnetic pole positions in the radial direction is small, and the maximum allowable error is $\gamma°$.

Here, as for the value of $\gamma$, when the stator 14 has 9 slots and the number of poles of the rotor 12 is 12, for example, it is 2.5° for the quadruple precision brushless motor.

Figure 3:
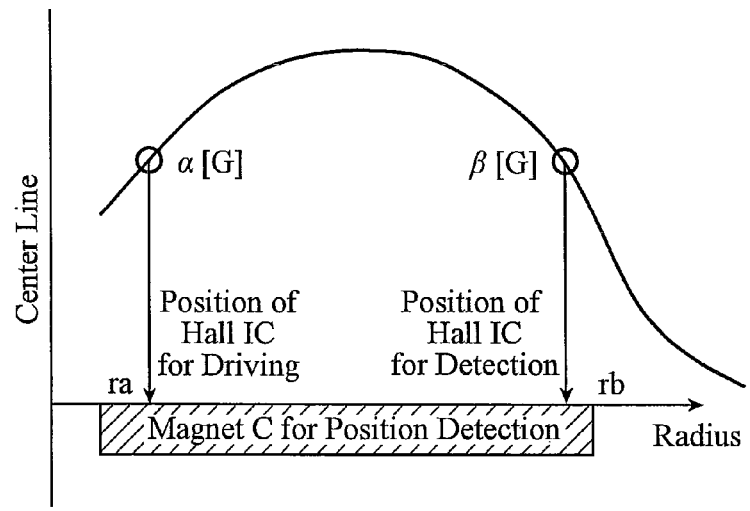
FIG. 3 is a schematic diagram showing a cross section of a magnet and the magnitude of the magnetic flux density in the direction of the radius of the brushless motor position detection device of the embodiment 1 in accordance with the present invention.

FIG. 3 is a schematic diagram showing, with respect to the magnetic pole position detecting magnet 16, the position of the main Hall IC 18 for detecting magnetic pole position and that of the sub-Hall IC 19 for detecting magnetic pole position in the radial direction, and the magnitude of the magnetic flux density to be detected.

As shown in FIG. 3, the magnetic pole position detecting magnet 16 is placed in such a manner that the magnetic flux density $\alpha$ [G] at the radial position ra of the main Hall IC 18 for detecting magnetic pole position becomes approximately equal to the magnetic flux density $\beta$ [G] at the radial position rb of the sub-Hall IC 19 for detecting magnetic pole position.

Figure 4:
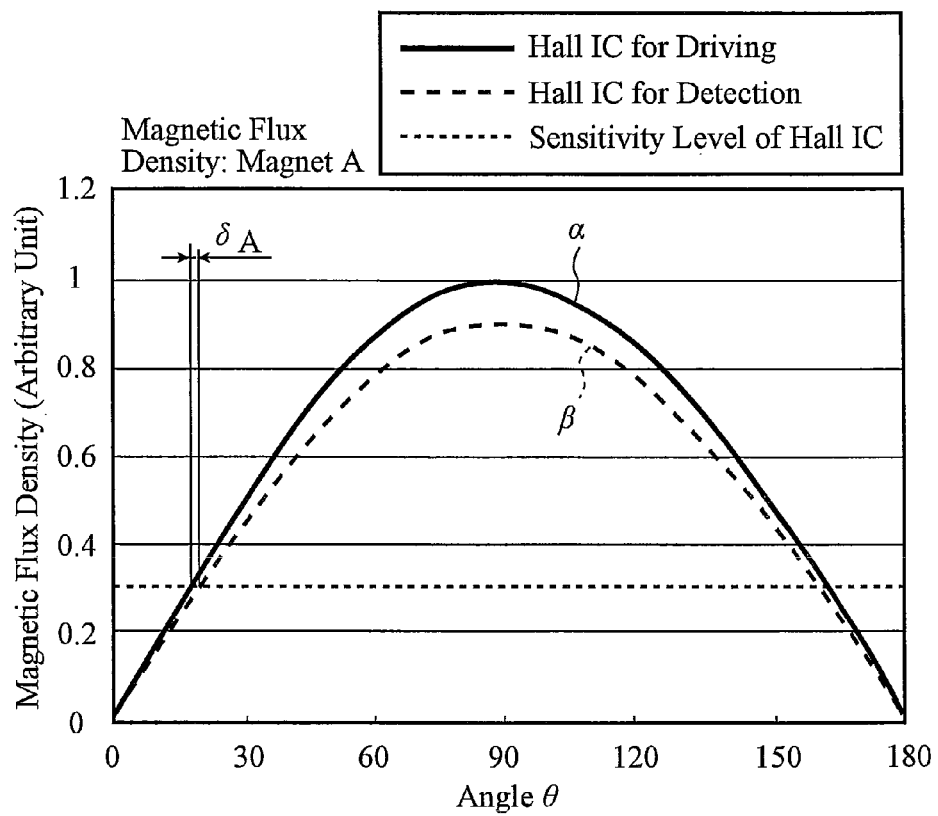
FIG. 4 is a diagram showing magnetic flux density distribution of the brushless motor position detection device of the embodiment 1 in accordance with the present invention.

FIG. 4 is a diagram showing the variations of the magnetic flux density at the mounting positions of the main Hall IC 18 for detecting magnetic pole position and of the sub-Hall IC 19 for detecting magnetic pole position in the circumferential direction with respect to the circumferential direction angle, that is, the magnetic flux density distribution at $\alpha$ and $\beta$ each. Here, the sensitivity level of the Hall ICs 18 and 19 used is further shown.

As shown in FIG. 4, the error between the circumferential direction angles at which the main Hall IC 18 for detecting magnetic pole position and the sub-Hall IC 19 for detecting magnetic pole position detect the magnetic flux density with the same level is $\delta_A$. In this case, since the magnetic pole position detecting magnet 16 is placed in such a manner that magnetic flux density the main Hall IC 18 for detecting magnetic pole position detects becomes approximately equal to the magnetic flux density the sub-Hall IC 19 for detecting magnetic pole position detects, the angle error $\delta_A$ for the same sensitivity level becomes minimum. As a result, it becomes possible to make the angle error $\delta_A$ small enough as compared with the offset angle $\gamma$ between the main Hall IC 18 for detecting magnetic pole position and the sub-Hall IC 19 for detecting magnetic pole position in the circumferential direction, which offers an advantage of being able to achieve highly accurate position detection.

For example, when the stator 14 has 9 slots and the rotor 12 has 12 poles, it is enough to arrange the magnetic pole position detecting magnet 16 in such a manner as to make the angle error less than 2.5° for the quadruple precision brushless motor. In this way, by setting a prescribed limit of the detection error of the rotor at the positions of the first Hall elements and the second Hall elements within a limit of 5°, the detection error can be retained within a practically required limit.

As described above, according to the brushless motor position detection device of the embodiment 1, it carries out offset adjustment in such a manner that the difference between the maximum value of the magnetic flux density at the mounting positions of the set of the first Hall elements (main Hall ICs 18 for detecting magnetic pole positions) and the maximum value of the magnetic flux density at the mounting positions of the set of the second Hall elements (sub-Hall ICs 19 for detecting magnetic pole positions), which are mounted on the surface facing the magnetic pole position detecting magnet 16 for detecting the position of the rotor 12, becomes within the prescribed limit in the arrangement of the Hall elements (arrangement made in such a manner as to have the offset of the prescribed machine angle in the circumferential direction). Thus, it can bring the detection accuracy of the plurality of sets of the Hall elements into agreement, thereby being able to limit the detection error.

In other words, the main Hall ICs 18 for detecting magnetic pole positions or the sub-Hall ICs 19 for detecting magnetic pole positions carry out ON or OFF operation when the magnetic flux density detected in response to the rotation of the magnetic pole position detecting magnet 16 becomes equal to or greater or less than a particular value (threshold). Accordingly, if the magnetic flux density detected with the sub-Hall ICs 19 for detecting magnetic pole positions is equal to the magnetic flux density detected with the main Hall ICs 18 for detecting magnetic pole positions, they carry out ON (or OFF) operation simultaneously. For this reason, the position of the magnetic pole position detecting magnet 16 is set in such a manner that the distribution of the magnetic flux density the main Hall ICs 18 for detecting magnetic pole positions perceive becomes approximately equal to the distribution of the magnetic flux density the sub-Hall ICs 19 for detecting magnetic pole positions perceive.

If the distribution of the magnetic flux density the main Hall ICs 18 for detecting magnetic pole positions detect agrees with the distribution of the magnetic flux density the sub-Hall ICs 19 for detecting magnetic pole positions detect, the prescribed machine angle offset is obtained by performing angle conversion of the timings at which the magnetic flux density the main Hall ICs 18 for detecting magnetic pole positions detect agrees with the magnetic flux density the sub-Hall ICs 19 for detecting magnetic pole positions detect. As a result, the detection angle error between the main Hall ICs 18 for detecting magnetic pole positions and the sub-Hall ICs 19 for detecting magnetic pole positions becomes minimum, thereby being able to achieve the quadruple precision position detection of the rotor 12.

According to the brushless motor position detection device of the embodiment 1 in accordance with the present invention described above, it makes the magnetic flux density distribution the main Hall ICs 18 for detecting magnetic pole positions detect approximately equal to that the sub-Hall ICs 19 for detecting magnetic pole positions detect. Thus, it can minimize the error between operation intervals of the two sets of the Hall ICs (the main Hall ICs 18 for detecting magnetic pole positions and the sub-Hall ICs 19 for detecting magnetic pole positions), thereby being able to achieve quadruple resolution of the single precision brushless motor with high reliability.

Embodiment 2

Incidentally, depending on the manner of magnetization or the shape of the magnet, it is possible to level the magnetic flux density the two sets of Hall ICs (the main Hall ICs 18 for detecting magnetic pole positions and the sub-Hall ICs 19 for detecting magnetic pole positions) detect, and to reduce the rate of change in the magnetic flux density of the magnetic pole positions in the radial direction. This can prevent the magnetic flux density from varying sharply even if the mounting positions of the two sets of Hall ICs deviate a little.

Figure 5:
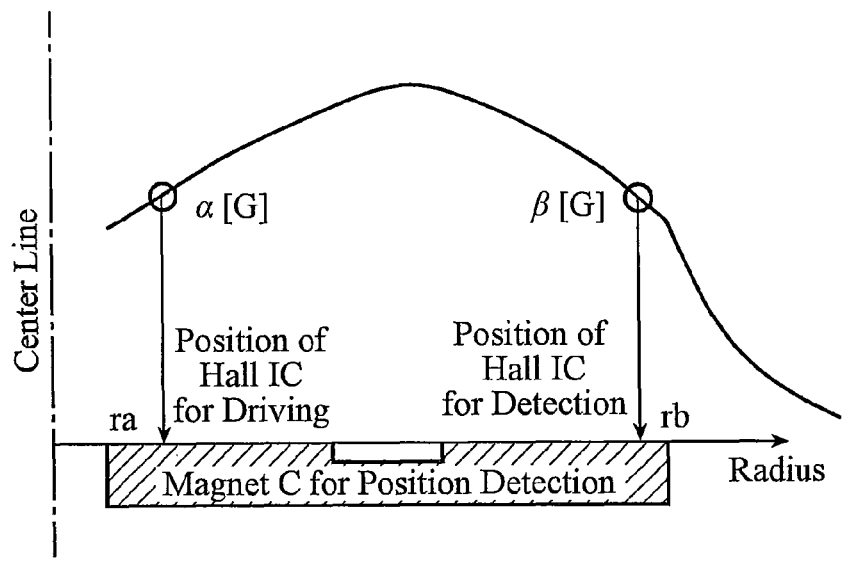
FIG. 5 is a schematic diagram showing a cross section of the magnet and variations in the magnetic flux density in the direction of the radius of the brushless motor position detection device of the embodiment 1 in accordance with the present invention.

More specifically, as for the thickness of the magnetic pole position detecting magnet 16, although it is made equal in the radial direction in the foregoing embodiment 1, this is not essential. For example, the magnetic pole position detecting magnet 16 can be formed in such a manner as to be thinned midway as shown in FIG. 5, which schematically shows the radial direction position of the main Hall IC 18 for detecting magnetic pole position and that of the sub-Hall IC 19 for detecting magnetic pole position along with the detecting magnetic flux density they detect. As compared with the case where the thickness of the magnetic pole position detecting magnet 16 is uniform, changing the thickness midway makes it possible to reduce the rate of change of the magnetic flux density at the magnetic pole positions in the radial direction. This offers an advantage of being able to reduce the variations in the magnetic flux density with respect to the radial direction positions of the main Hall ICs 18 for detecting magnetic pole positions and of the sub-Hall ICs 19 for detecting magnetic pole positions.

However, as for the magnetic flux density distribution in the direction of the radius, it does not sometimes take such distribution as to have the maximum value between the main Hall IC 18 for detecting magnetic pole position and the sub-Hall IC 19 for detecting magnetic pole position as shown in FIG. 5, but has a drop between them. However, what is important here is that the magnetic flux density at the mounting position of the main Hall IC 18 for detecting magnetic pole position is equal to that of the sub-Hall IC 19 for detecting magnetic pole position. Thus, it does not matter if there is a drop between the main Hall IC 18 for detecting magnetic pole position and the sub-Hall IC 19 for detecting magnetic pole position.

According to the embodiment 2, the position detecting magnet 16 has a relaxation section for relieving the variations in the magnetic flux density with respect to the rotation angle of the rotor 12. Accordingly, it can reduce the rate of change in magnetic flux density at the mounting positions of the main Hall ICs 18 for detecting magnetic pole positions and of the sub-Hall ICs 19 for detecting magnetic pole positions, thereby being able to facilitate the placement of the magnetic pole position detecting magnet 16.

Embodiment 3

Figure 6:
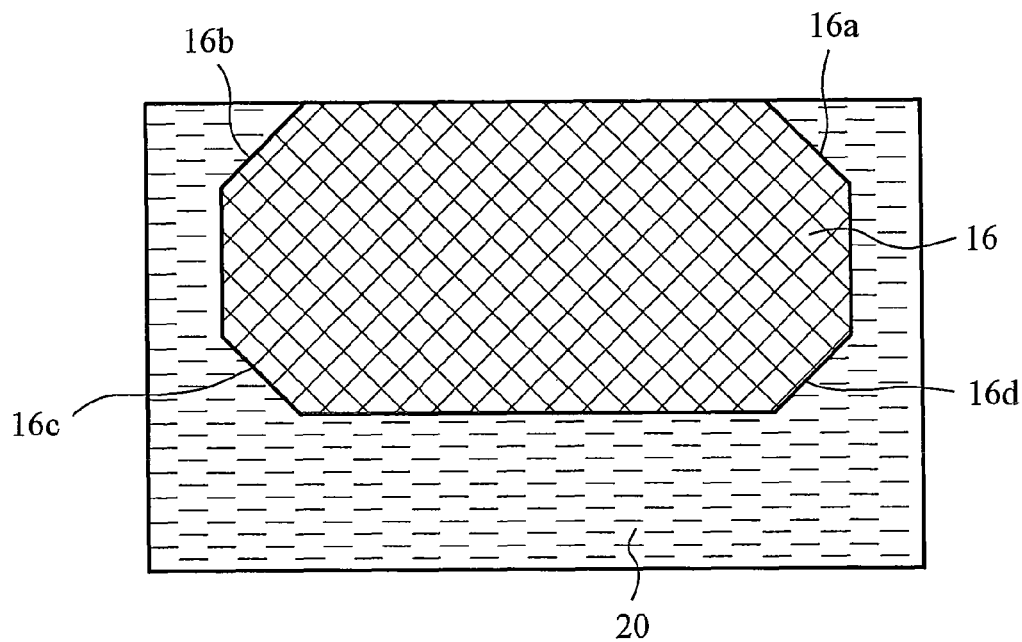
FIG. 6 is a view showing a cross section of a magnet of a brushless motor position detection device of an embodiment 3 in accordance with the present invention.

The magnetic pole position detecting magnet 16, a cross section structure of which is shown in FIG. 6, can have cutouts 16a-16d at the corners of the magnetic pole position detecting magnet 16.

Since the magnetic pole position detecting magnet 16 rotates at a high speed, it can move toward the outer circumference if its retaining strength is insufficient. In this case, the magnetic flux density distribution the main Hall ICs 18 for detecting magnetic pole positions detect and that the sub-Hall ICs 19 for detecting magnetic pole positions detect deviate. As a result, the timings at which the Hall ICs 18 and 19 turn ON (or OFF) also deviate. Accordingly, the expected position detection accuracy of the rotor 12 cannot be achieved.

In contrast with this, providing the cutouts 16a-16d at the corners of the magnetic pole position detecting magnet 16 as shown in FIG. 6 enables molding material 20 to go around the cutouts when molding the magnet, resulting in a structure in which the molding material 20 holds the magnetic pole position detecting magnet 16 at the four corners. As a result, it offers an advantage of being able to prevent the displacement of the magnet.

According to the embodiment 3 described above, providing the cutouts 16a-16d at any desired corners of the position detecting magnet 16 can enable the molding material 20 to go around the cutouts 16a-16d when molding the magnet, thereby being able to prevent the displacement thereof. Thus, they can be said to be an essential displacement restraining means for quadruple high precision brushless motor.

Incidentally, although the brushless motor position detection devices of the foregoing embodiment 1-embodiment 3 are applicable to any uses, they achieve great advantages when used for onboard devices that require miniaturization and durability. In particular, they can be used as a driving source for opening and closing a throttle valve or EGR valve, or as a driving source of the movable vane of a VG turbo.

The brushless motor position detection device in accordance with the present invention is applicable to a brushless motor operated by a direct current. In particular, it is effective in improving the resolution of the rotation position detection of the rotor 12 by using the magnetic pole position detecting magnet 16, the main Hall ICs 18 for detecting magnetic pole positions and the sub-Hall ICs 19 for detecting magnetic pole positions for improving the resolution of the rotation position detection of the rotor 12.

Industrial Applicability

As described above, to improve the reliability by holding the detection angle error between the main Hall ICs for detecting magnetic pole positions and the sub-Hall ICs for detecting magnetic pole positions to a minimum, the brushless motor position detection device in accordance with the present invention is configured in such a manner as to include a set of the first Hall elements mounted on a plane facing the magnetic pole position detecting magnet for detecting the position of the rotor, and a set of the second Hall elements whose offset is adjusted in such a manner that the difference between the maximum value of the magnetic flux density at the mounting positions of the first Hall elements and the maximum value of the magnetic flux density at the mounting positions of the second Hall elements becomes within the prescribed limit. Accordingly, it is suitably used as a driving source of a throttle valve or EGR valve used for an onboard device, or as a driving source of the movable vane of a VG turbo.

What is claimed is:

1. A brushless motor position detection device comprising:
a stator having a plurality of coils mounted;
a rotor that has a prescribed number of poles and rotates when the stator is successively excited by a plurality of exciting patterns;
a magnetic pole position detecting magnet mounted on a plane perpendicular to a rotation axis of the rotor;
a set of first Hall elements mounted on a plane facing the magnetic pole position detecting magnet for detecting the position of the rotor; and
a set of second Hall elements whose offset is adjusted in a manner as to keep difference between a maximum value of magnetic flux density at mounting positions of the first Hall elements and a maximum value of magnetic flux density at mounting positions of the second Hall elements within a prescribed limit.

2. The brushless motor position detection device according to claim 1, wherein the prescribed limit is set by offset adjustment that keeps a detection error between rotation angles of the rotor at the mounting positions of the first Hall elements and second Hall elements within five degrees.

3. The brushless motor position detection device according to claim 1, wherein the magnetic pole position detecting magnet comprises, as for distribution of the magnetic flux density with respect to a rotation angle of the rotor, a relaxation section for relieving variations in the distribution of the magnetic flux density by thinning a thickness of the magnetic pole position detecting magnet in an intermediate region of the magnetic pole position detecting magnet.

4. The brushless motor position detection device according to claim 1, wherein the magnetic pole position detecting magnet is composed of a ring magnet.

5. The brushless motor position detection device according to claim 1, wherein the set of the second Hall elements have a prescribed offset in a circumferential direction with respect to the set of the first Hall elements mounted on the plane facing the position detecting magnet with a number of poles twice that of the rotor.

6. The brushless motor position detection device according to claim 5, wherein the magnetic pole position detecting magnet has cutouts at its corners.

* * * * *